United States Patent
Mohr (10) Patent No.: US 7,873,615 B2
(45) Date of Patent: Jan. 18, 2011

(54) CONTROL OBJECT BASED REPORT GENERATION USING A CENTRAL CLASS

(75) Inventor: Christian Mohr, Wiesloch (DE)

(73) Assignee: SAP AG, Walldorf (DE)

( * ) Notice: Subject to any disclaimer, the term of this patent is extended or adjusted under 35 U.S.C. 154(b) by 780 days.

(21) Appl. No.: 11/300,949

(22) Filed: Dec. 14, 2005

(65) Prior Publication Data

US 2007/0193645 A1      Aug. 23, 2007

(51) Int. Cl.
*G06F 7/00* (2006.01)
*G06F 17/30* (2006.01)

(52) U.S. Cl. .................. 707/705; 707/999.001
(58) Field of Classification Search ............... 707/104.1
See application file for complete search history.

(56) References Cited

U.S. PATENT DOCUMENTS

| | | | | |
|---|---|---|---|---|
| 5,581,758 A * | 12/1996 | Burnett et al. | ......... | 707/103 R |
| 5,664,182 A * | 9/1997 | Nierenberg et al. | ......... | 707/102 |
| 5,787,283 A * | 7/1998 | Chin et al. | .................. | 717/101 |
| 6,061,692 A * | 5/2000 | Thomas et al. | ............. | 707/200 |
| 6,106,569 A * | 8/2000 | Bohrer et al. | ............... | 717/100 |
| 6,173,289 B1 * | 1/2001 | Sonderegger et al. | ... | 707/103 R |
| 6,226,692 B1 * | 5/2001 | Miloushev et al. | ......... | 719/316 |
| 6,633,875 B2 * | 10/2003 | Brady | ...................... | 705/36 R |
| 6,968,538 B2 * | 11/2005 | Rust et al. | .................. | 717/108 |
| 6,990,653 B1 * | 1/2006 | Burd et al. | .................. | 717/108 |
| 7,007,034 B1 * | 2/2006 | Hartman et al. | ............. | 707/102 |
| 7,043,311 B2 * | 5/2006 | Nixon et al. | ................... | 700/83 |
| 7,043,488 B1 * | 5/2006 | Baer et al. | ................... | 707/101 |
| 7,062,500 B1 * | 6/2006 | Hall et al. | ................... | 707/102 |
| 7,076,494 B1 * | 7/2006 | Baer et al. | ..................... | 707/102 |
| 7,096,465 B1 * | 8/2006 | Dardinski et al. | ........... | 717/178 |
| 7,272,815 B1 * | 9/2007 | Eldridge et al. | ............. | 717/101 |
| 7,366,723 B2 * | 4/2008 | Shaburov | .................... | 707/10 |
| 2002/0199031 A1 * | 12/2002 | Rust et al. | .................. | 709/315 |
| 2003/0101287 A1 * | 5/2003 | Novik et al. | ................ | 709/318 |

(Continued)

FOREIGN PATENT DOCUMENTS

EP        1251427 A2 *    10/2002

(Continued)

OTHER PUBLICATIONS

Caprio, Griffin, Design Patterns: Dependency Injection, MSDN Magazine, Sep. 2005, 12 pages.*

(Continued)

*Primary Examiner*—Mohammad Ali
*Assistant Examiner*—Griselle Corbo
(74) *Attorney, Agent, or Firm*—Mintz, Levin, Cohn, Ferris, Glovsky and Popeo, PC (57) ABSTRACT

A system and technique for generating reports dealing with control objects utilizing a central class, such as a control factory class, without redundant use of container and control classes. The central class creates the entire graphical user interface needed in a particular report during the report's initialization. By calling the central class, the programmer does not have to initialize the class and use a special object within the program and simply may provide the central class with two tables: a container table and a control table. The programmer need not provide the actual control and container classes to the central class through the tables. The programmer need only provide the description of the construction of the graphical user interface through the tables.

20 Claims, 6 Drawing Sheets

U.S. PATENT DOCUMENTS

| | | | |
|---|---|---|---|
| 2004/0093560 A1* | 5/2004 | Monterrosas | 715/513 |
| 2005/0108258 A1* | 5/2005 | Olander et al. | 707/100 |
| 2005/0108647 A1* | 5/2005 | Musson et al. | 715/744 |
| 2005/0154742 A1* | 7/2005 | Roth et al. | 707/100 |
| 2005/0273365 A1* | 12/2005 | Baumgartner et al. | 705/3 |
| 2006/0070084 A1* | 3/2006 | Novik et al. | 719/318 |
| 2006/0101038 A1* | 5/2006 | Gabriel et al. | 707/100 |
| 2006/0179437 A1* | 8/2006 | Hong et al. | 718/104 |
| 2006/0206866 A1* | 9/2006 | Eldrige et al. | 717/122 |
| 2007/0110233 A1* | 5/2007 | Polk et al. | 380/30 |
| 2007/0130517 A1* | 6/2007 | Wu | 715/530 |
| 2007/0139441 A1* | 6/2007 | Lucas et al. | 345/619 |
| 2007/0165031 A1* | 7/2007 | Gilbert et al. | 345/473 |
| 2007/0168060 A1* | 7/2007 | Nixon et al. | 700/83 |
| 2007/0179641 A1* | 8/2007 | Lucas et al. | 700/83 |
| 2007/0211079 A1* | 9/2007 | Nixon et al. | 345/619 |
| 2008/0082959 A1* | 4/2008 | Fowler | 717/104 |
| 2008/0114790 A1* | 5/2008 | Hall et al. | 707/100 |
| 2009/0157711 A1* | 6/2009 | Baer et al. | 707/101 |
| 2010/0168874 A1* | 7/2010 | Lucas et al. | 700/17 |

OTHER PUBLICATIONS

Fowler, Martin, Inversion of Control Containers and the Dependency Injection pattern, Jan. 23, 2004, 17 pages.*

* cited by examiner

CONTROL OBJECT BASED REPORT GENERATION USING A CENTRAL CLASS

BACKGROUND

The subject matter described herein relates to report generation using control objects, for example, a list viewer (ALV) grid, text edit, picture, SAP toolbar, and HTML viewer controls.

By using control objects for report generation, it is necessary to implement both control and container classes in each report which deals with the controls. Such an arrangement may result in additional overhead, redundant coding, and an increase in time necessary to generate each report.

SUMMARY

The present inventor recognized that to generate reports that deal with graphical user interfaces (GUI) and SAP control objects, a programmer must implement container and control classes to use the control framework (CFW). The present inventor also recognized that the CFW provides a programmer with a large amount of functionality but the redundant use of classes within each and every report is typically not intuitive or user-friendly to even a programmer. Consequently, the present inventor developed the subject matter described herein which enables programmers to create reports without redundant use of classes to generate each and every report by providing a central class that the programmer may call. The central class (e.g., a control factory class) creates an entire graphical user interface (GUI) needed in a particular report during its initialization. By calling the central class, the programmer does not have to initialize the class and use a special object within the program as was required using control and container classes. The programmer simply may provide the central class with two tables: a container table and a control table. The programmer need not provide the actual control and container classes to the central class through the tables. Instead, the programmer need only provide the information or description of the construction of the GUI through the tables (i.e., the information that describes the containers and the control objects, e.g., ALV grid control). Systems and techniques, including computer program products, for generating reports dealing with control objects, such as ALV grid controls and TREE controls, are provided.

In one aspect, an indication of an activation of a triggering report may be received. Thereafter, a container table and a control table associated with the triggering report may be accessed. Control information from the container table and the control table may be obtained so that one or more container objects and one or more control objects based on the obtained control information may be generated. The control objects may include number information and level information. One or more container objects and one or more control objects may then be displayed. Optionally, data associated with the triggering report may be collected from a data repository and the collected data may also be displayed.

In one variation, the container and control objects may be displayed in the order that they are generated. With such an arrangement, one or more container objects may be generated based on the obtained control information corresponding to the container table. In addition, one or more control objects may be generated for each container object based on the obtained control information corresponding to the control table. In some implementations, the one or more container objects are generated before the one or more control objects. Also, at least one generated container object may be a docking container. Similarly, one of the generated container objects may be a splitter container that is generated before the docking container.

In an interrelated aspect, a container table may be defined which comprises one or more container objects and a control table may be defined which comprises one or more control objects. Thereafter, the container table and the control table to a central class may be associated so that a central class may be assigned to a triggering report.

A container table may be defined by specifying one or more container objects, assigning to each specified container object an internal number, identifying a container type, such as a docking container, a splitter or a custom container, for each specified container object, and identifying a level for locating each specified container object. In one aspect, the container type for at least one specified container is a docking container and the level for the docking container object is a first level. In another aspect, the container type for at least one specified container is a custom container and the level for the custom container object is a first level. In yet another aspect, the container type for at least one specified container is a splitter container and the level for the custom container object is a first level. An additional operation may include specifying an alignment and width for each specified container object.

A control table may be defined by inserting a selection of a control object into one of the container objects, such as a docking container object, a custom container object or splitter container object, so that the control object is located in one of the container objects at a first level. In another aspect, the control object can be located in a container at a second level. For example, where at least one specified container is a docking container or a custom container, the control table may be defined by defining at one of the container objects as a splitter container object, associating the splitter container object with the docking or custom container object, inserting a selection of a control object into the splitter container object, and placing the splitter container on a second level. Additionally, one of the container objects may be defined as a splitter container object by identifying a container type for at least one of the control objects as a splitter container, assigning an internal number to the splitter container object, and defining one or more rows and one or more columns for the splitter container object. The association of the splitter container object with the docketing or custom container object may, in some variations, include an operation of designating the docking or custom container object as the parent of the splitter container object.

Computer program products, which may be embodied on computer readable-material, are also described. Such computer program products may include executable instructions that cause a computer system to conduct one or more of the method acts described herein.

Similarly, computer systems are also described that may include a processor and a memory coupled to the processor. The memory may encode one or more programs that cause the processor to perform one or more of the method acts described herein.

The subject matter described herein may provide one or more of the following advantages. Using a central class, such as a control factory, for report generation decreases the time and cost of generating reports that deal with controls because it is no longer necessary to implement both control and container classes for each such report. Thus, the programmer may focus on the buildup of the program and no longer needs to be concerned with the actual implementation of the program. Furthermore, controls in custom containers may be possible. Moreover, a screen painter may be used to set the control objects graphically before creating them and the presentation logic may then be generated automatically.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
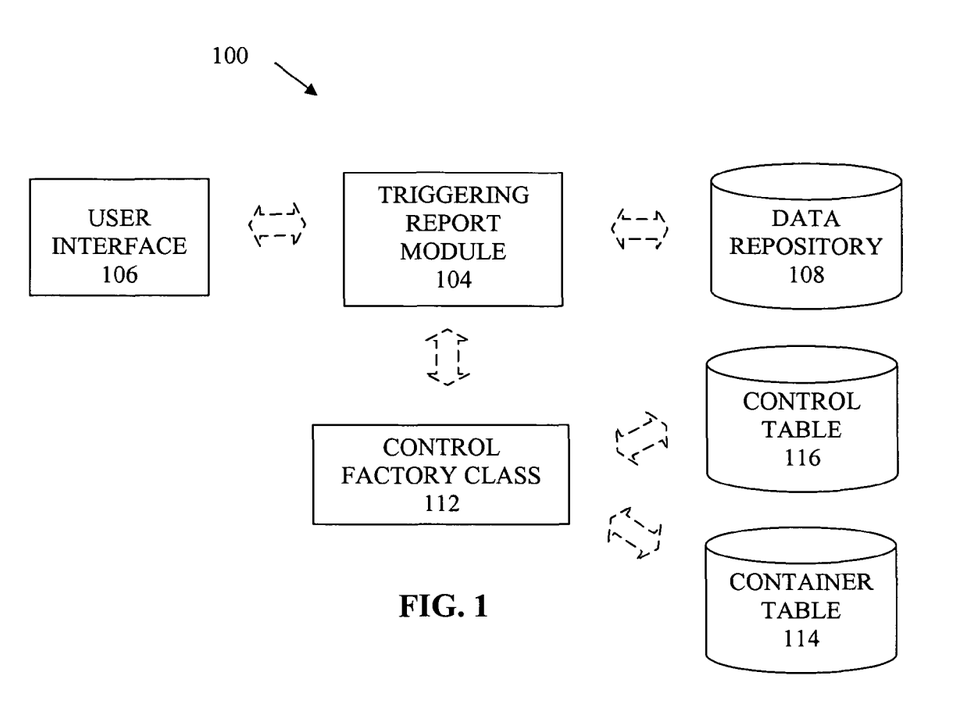
FIG. 1 is a schematic of a system for generating a report using a central class.

FIG. 1 is a schematic of a system 100 for generating a report using a central class (or control factory class) 112. A triggering report module 104 collects application data to display in a user interface 106, such as a GUI, from data repository 108. The triggering report module 104 also defines control information, which may include the control objects to be displayed in the user interface 106, e.g., ALV grid, text edit, picture, SAP toolbar, TREE, and HTML viewer controls, and the manner in which the control objects are to be displayed in the user interface 106. The control information is provided in the container table 114 and control table 116, both of which are provided to the control factory class 112. The display of the control objects on the user interface 106 is managed by the control factory class 112 through the triggering report module 104.

Figure 2:
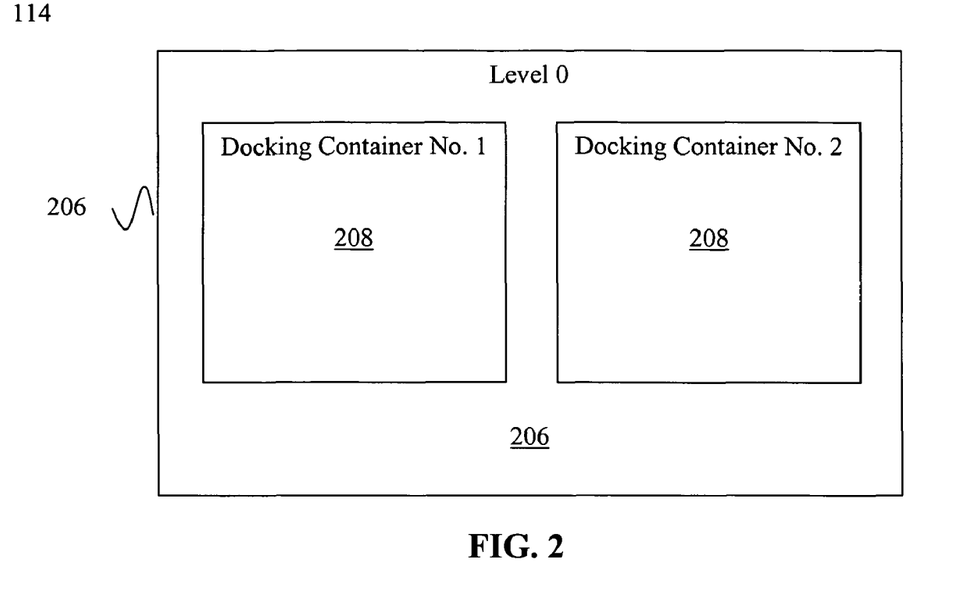
FIG. 2 depicts an implementation of a container table.

FIG. 2 depicts an implementation of the container table 114, which includes one or more levels 206 and one or more docking containers 208, in which control information may be provided. Docking containers are container objects that are the basis for other objects, e.g., other container objects or control objects, such as ALV grid control or TREE control. The following code module, written in ABAP (although any other suitable language could be used), generally is suitable to build a container table.

```
l_str_containers-cont_num = '1'.
l_str_containers-container_type = 'DOC'.
l_str_containers-container_doc_param-cont_align = 'L'.
l_str_containers-container_doc_param-cont_width = '400'.
l_str containers-container_level = '0'.
APPEND l_str_containers TO l_tab_containers.
```

As noted in the code module, a docking container 208 with an internal number "1" (or Docking Container Nr 1) will be created by the control factory class 112, which has a left alignment and a width of 400 pixels, and is located in level 206 (or level 0). Likewise, docketing container 208, that is Docking Container Nr. 2, can be similarly created by the control factory class 112. The docking containers 208 are referenced in the code module as "1_tab_containers".

Figure 3:
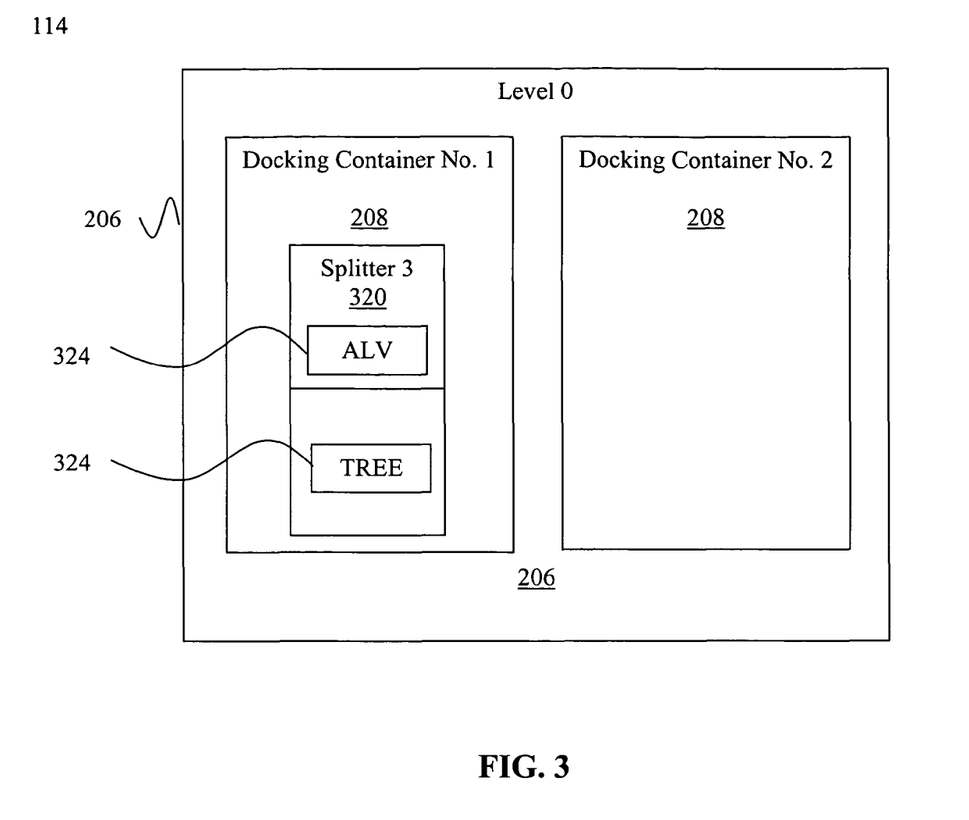
FIG. 3 depicts an implementation of a control table relative to the container table.

FIG. 3 depicts an implementation of the control table 116. The container table 114 can be enriched by a splitter container 320, which can hold one or more screen objects 324, e.g., an ALV grid control. In the code example below, an ALV Grid control is given to the control table 116. The ALV Grid control belongs to the splitter container 320 dataset within the container table 116. Alternatively, the splitter container 320 need not be used, and instead the one or more screen objects 324 may be held directly in the docking container 208. The screen objects 324 may be any type of control object, such as an ALV grid control, text edit, picture, SAP toolbar, TREE, and HTML viewer control, or any other suitable control. The screen objects 324 hold application data that is stored within the triggering report module that calls the control factory class.

The following code module, written in ABAP (although any other suitable language could be used), generally is suitable to build a control table.

```
l_str_containers-cont_num = '3'.
l_str_containers-container_type = 'SPL'.
l_str_containers-container_level = '1'.
l_str_containers-cont_parent = '1'.
l_str_containers-split_rows = '2';.
l_str_containers-split_cols = '1'.
APPEND l_str_containers TO l_tab_containers.
l_str_screen_objects-control_type = 'ALV'.
l_str_screen_objects-cont_parent = '3'.
l_str_screen_objects-alv_parameter-structure_name =
   'ANY STRUCTURE'.
l_str_screen_objects-s_row = '1'. 'Splitter Container
in Split Screen Row
l_str_screen_objects-s_col = '1'. 'Splitter Container
in Split Screen Column
    Delivery of the ALV Grid Control-Pointer Reference
GET REFERENCE OF g_tab_data
    INTO l_str_screen_objects-alv_parameter-g_table_pointer.
APPEND l_str_screen_objects TO l_tab_screen_objects.
```

As noted in the code module, a splitter container 320 (SPL) with the number 3 will be created. The splitter container 320 will be placed on the next level, that is level 1, and will have the docking container 208 (i.e., Docking Container Nr. 1) as its parent, with two rows and one column. This relation is described in the table "1_tab_containers" in the code module. Thereafter, a screen object 324 will be placed in to the splitter container 320 and properly aligned, that is in the first row. In this case, the screen object 324 is an ALV grid control (and as shown in FIG. 3, another screen object is TREE control), which will be placed into the splitter container 320. The screen objects 324 are described in the table "1_tab-_screen_objects" in the code module. The application data is one of the parameters of the screen objects table. In this case, the screen object 324, i.e., the ALV grid control, is a reference to the structure 1_str_screen_objects, which has a field called "alv_parameter-g_table_pointer." This field holds a pointer reference to the application data that is stored within the triggering report module that calls the control factory class. As such, the control factory class is independent from any specific data.

With reference back to FIG. 1, as mentioned above, the display of the control objects is managed by the control factory class 112. The following code module, written in ABAP (although any other suitable language could be used), generally is suitable to display the control objects provided through the control information in the container table 114 and control table 116.

```
CALL METHOD factory_class=>create_screen
    EXPORTING
*       I_CUSTOM_CONTROL =
*       I_STR_SCREEN_OBJECTS =
        i_tab_containers = l_tab_containers
        i_tab_screen_objects = l_tab_screen_objects
    RECEIVING
        e_screen_handler = l_ref_screen_handler.
```

By calling the static method 'create_screen' of the control factory class 112, an object of this class is initialized with the passed parameters. Within the constructor of the control factory class 112 the container objects, e.g., the docking containers 208 (FIG. 2), and the control information, e.g., the screen objects 324 (FIG. 3), are created according to their number and level information to form the GUI elements of a GUI. Thus, as seen in FIG. 3, the docking container 208 is typically created first, then the splitter container 320 is created, and then the screen object 324 (i.e., ALV grid control) is created.

Figure 4:
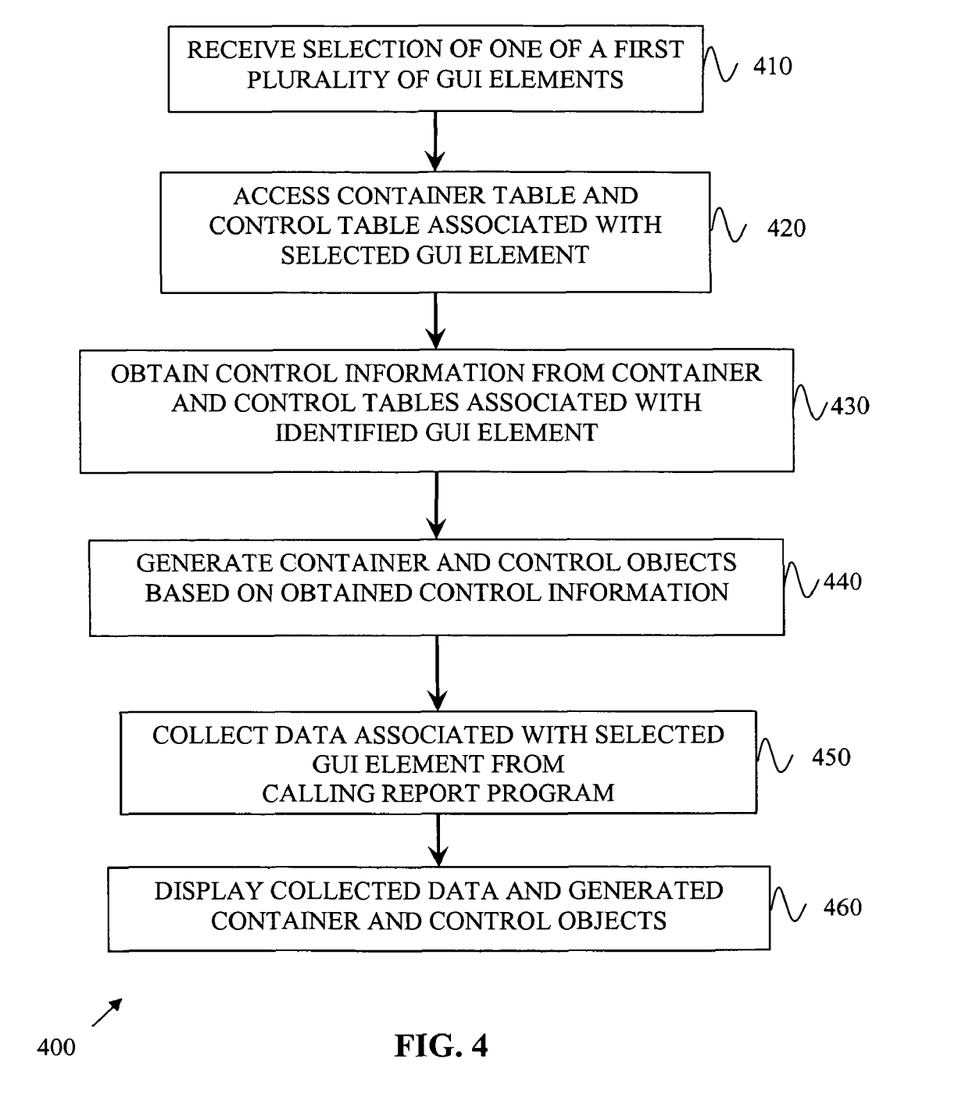
FIG. 4 is a flow diagram depicting an implementation of a process for generating a report using a central class.

FIG. 4 is a flow diagram depicting an implementation of a process 400 for generating a report using a central class, such as a control factory class. At 410, a selection of one of a first plurality of graphical user interface elements of a first graphical user interface is received by the control factory class. At 420, a container table and a control table associated with the selected GUI element are accessed by the control factory class. Both tables have information related to the construction of a second GUI. At 430, the information from the container and control tables are obtained. Based on the obtained information in the container and control tables, at 440, container objects, e.g., the docking containers 208 (FIG. 2), and control objects, e.g., the screen objects 324 (FIG. 3) are generated by the control factory class. At 450, data associated with the selected GUI element is collected from a calling report program, e.g., the triggering report module, and is given to the control table. At 460, the collected data and container and control objects are displayed.

Figure 5:
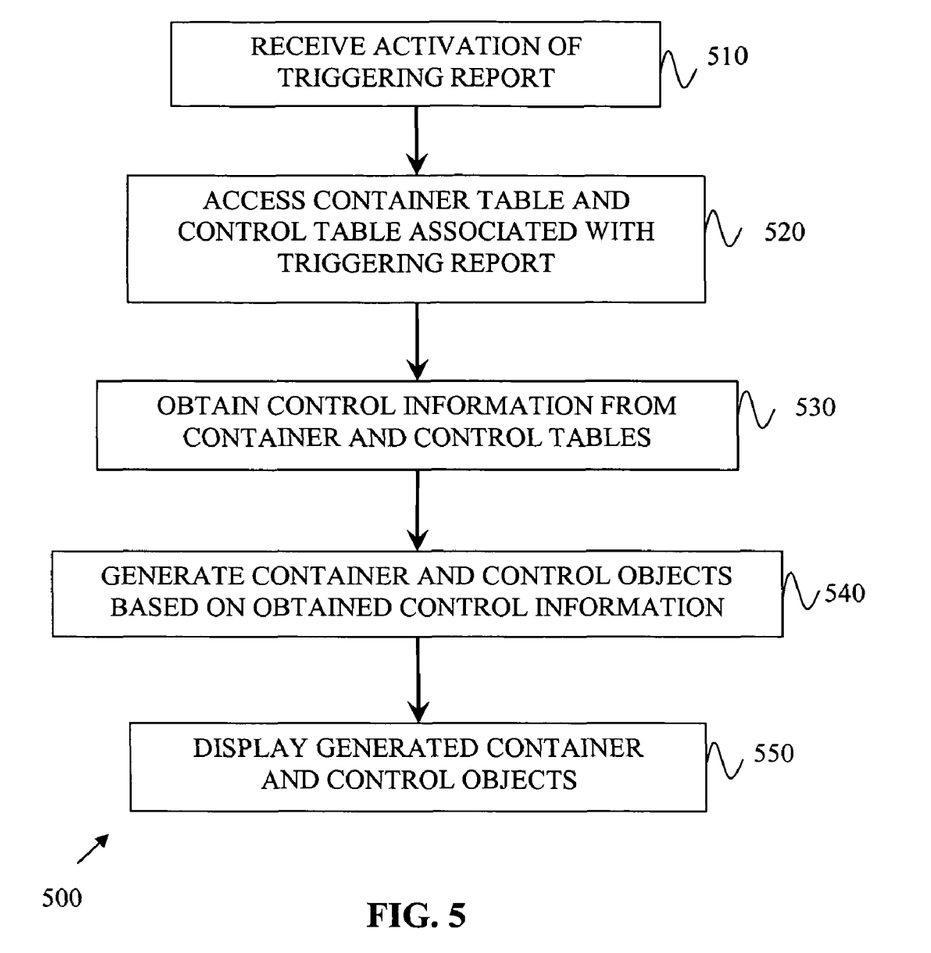
FIG. 5 is a flow diagram depicting another implementation of a process for generating a report.

FIG. 5 is a flow diagram depicting another interrelated implementation of a process 500 for generating a report using a central class, such as a control factory class. At 510, an activation of a triggering report is received by the control factory class. At 520, a container table and a control table associated with the trigger report are accessed by the control factory class. Both tables have information related to the construction of container and control objects. At 430, the information from the container and control tables are obtained. Based on the obtained information in the container and control tables, at 540, container objects, e.g., the docking containers 208 (FIG. 2), and control objects, e.g., the screen objects 324 (FIG. 3) are generated by the control factory class. At 550, the container and control objects are displayed.

Figure 6:
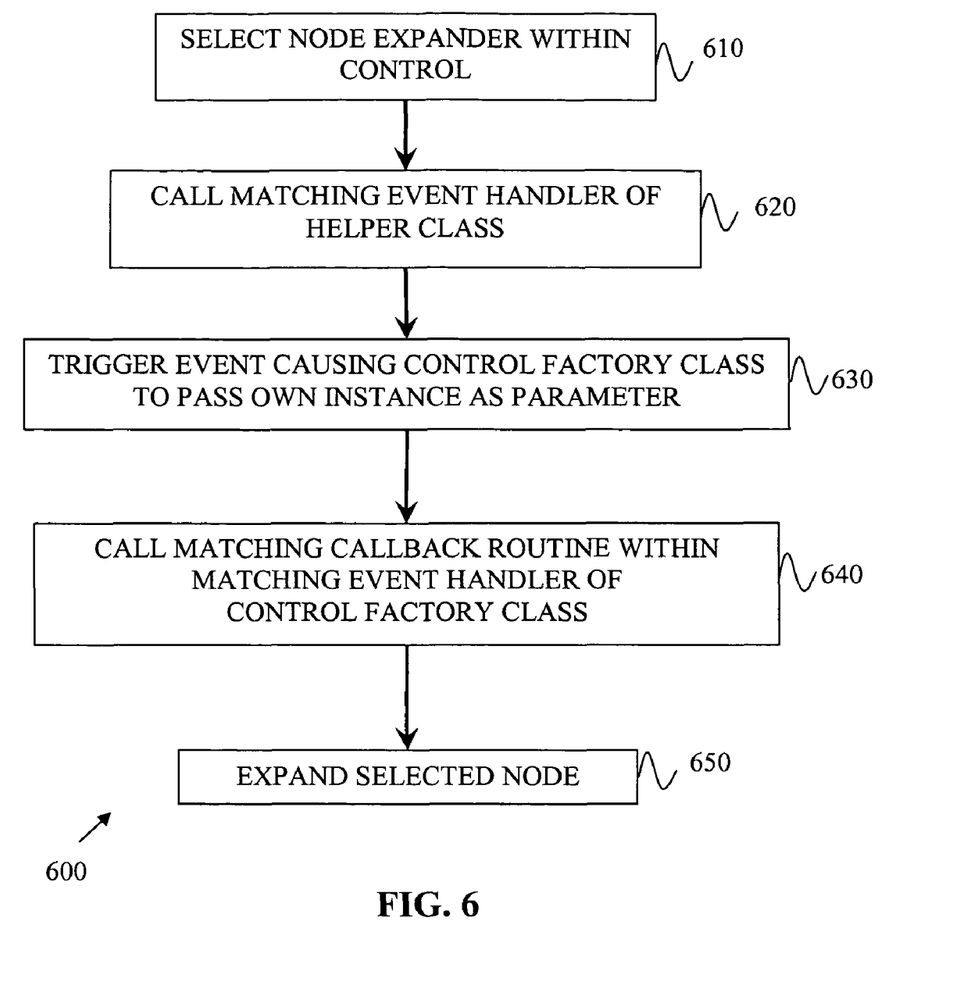
FIG. 6 is a flow diagram depicting a process for handling events implemented within a central class, such as control factory class.

FIG. 6 is a flow diagram depicting a process 600 for handling events implemented within a control factory class. Events, such as expanding a tree node in the GUI, are implemented within the control factory class as event handler methods. Often times, it is unknown which control sends an event or which data has to be changed or displayed. As such, the control factory class may utilize helper classes, which carry their data by themselves and are inherited from the CFW control classes. For event processing, callback routines within the triggering report module may be used. This makes it possible to provide the user with points of time that correspond to the possible events of a control. The points of time may be fixed in a standard customization, for example. Thus, the call of the callback routines within the control factory class can be handled dynamically. In a customizing table for the callback routines the columns may include: a calling program; a name of the callback routine; and a point of time (i.e., event) identification.

The following code module, written in ABAP (although any other suitable language could be used), generally is suitable to build a node table by using a callback routine within the triggering report module.

```
PERFORM (l_str_callback-cf_routine) IN PROGRAM
  (l_str_callback-cf_program)
  CHANGING l_str_screen_objects-stree_parameter-g_node_table.
CREATE OBJECT l_simple_tree
    EXPORTING
        node_selection_mode = l_simple_tree_model=>
        node_sel_mode_single
*       HIDE_SELECTION          =
    EXCEPTIONS
        illegal_node_selection_mode  = 1
*       others                       = 2
CALL METHOD l_simple_tree->set_node_table
    EXPORTING
        i_node_table =
        l_str_screen_objects-stree_parameter-g_node_table.
SET HANDLER handle_str_expand_node FOR l_simple_tree.
```

As noted in the code module, a node table is built by a callback routine within the triggering report module. Thereafter, a helper object is initialized that is inherited from the Simple Tree class of the CFW. This helper object holds the data which is necessary for the display of the control objects, as well as the matching event handler.

The process 600 for handling events implemented within a control factory class may include the following steps. At 610, a user selects a node expander within a control. Based on the selected node, at 620, a matching event handler of a helper class, which holds the data, is called. The following code module, written in ABAP (although any other suitable language could be used), generally is suitable to generate the matching event handler of the helper class.

```
METHOD handle_expand_node.
    C1_gui_cfw=>flush( ).
    RAISE EVENT cf_expand_no_children
    EXPORTING
        e_nodekey              = node_key
        e_simple_tree_instance = me.
ENDMETHOD.
```

At 630, the matching event handler itself triggers an event, which causes the control factory class to react by passing its own instance as a parameter. Then, at 640, within a matching event handler of the control factory class, a matching callback routine from a triggering report module is called, which is responsible for collection of data to display from a data repository. At 650, additional data may be collected, data within the helper object may be changed and a method of the CFW is called, which expands the selected node.

The following code module, written in ABAP (although any other suitable language could be used), generally is suitable to generate the matching event handler of the control factory class.

```
METHOD handle_str_expand_node.
    DATA: 1_str._callback LIKE LINE OF a_tab_callback
        WITH KEY step = '102'.
    PERFORM (1_str_callback-cf_routine) IN PROGRAM
(1_str_callback-cf_program) USING e_nodekey
    e_simple_tree_instance.
ENDMETHOD.
```

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, steps in a flow diagram may be replaced with other steps, additional steps may be added, some steps optionally may be removed, and/or steps may be performed in a different order, or in parallel, relative to the order depicted. Accordingly, other embodiments are within the scope of the following claims.

What is claimed is:

1. A computer program product, embodied on computer-readable storage material, said computer program product including executable instructions causing a data processing apparatus to:
   receive, by a control factory class, an activation of a triggering report, the triggering report comprising a report to be rendered in a graphical user interface using control objects;
   access, by the control factory class, a container table and a control table associated with the triggering report, the container table and the control table associated with the control factory class assigned to the triggering report such that the control factory class uses the container table and the control table to provide control information rather than provide each of a container class and a control class for the control information;
   separately obtain, by the control factory class, control information from (i) the container table and (ii) the control table, the control information comprising a number information and a level information for each container object;
   generate, by the control factory class, one or more container objects and one or more control objects based on the obtained control information, the container objects being created in a sequence specified by their corresponding number information and level information; and
   initiate, by the control factory class, display of the one or more container objects and the one or more control objects in the form of the report in the graphical user interface.

2. A computer program product as in claim 1, wherein the instructions to display the one or more container objects and the one or more control objects comprises instructions to: display the one or more container objects and the one or more control objects in an order that the one or more container objects and the one or more control objects are generated.

3. A computer program product as in claim 1, further comprising executable instructions causing a data processing apparatus to:
   collect data associated with the triggering report from a data repository; and
   display the collected data.

4. A computer program product as in claim 1, wherein the instructions to generate one or more container objects and one or more control objects based on the obtained control information comprises instructions to:
   generate one or more container objects based on the obtained control information corresponding to the container table; and
   generate for each container object one or more control objects based on the obtained control information corresponding to the control table.

5. A computer program product as in claim 4, wherein at least one of the one or more container objects are generated before the one or more control objects.

6. A computer program product as in claim 5, wherein at least one generated container object is one of a docking container and custom container.

7. A computer program product as in claim 6, wherein at least one generated container object is a splitter container that is generated before the generated container object that is a docking container or a custom container.

8. A computer program product as in claim 6, wherein at least one generated control object is one of an ALV grid control, a TREE control, a text edit control, a picture control, an SAP toolbar control and a HTML viewer control.

9. A computer program product as in claim 8, further comprising executable instructions causing a data processing apparatus to:
   collect data associated with the triggering report from a data repository; and
   display the collected data.

10. A computer program product, embodied on computer-readable storage material, said computer program product including executable instructions causing a data processing apparatus to:
   define a container table comprising one or more container objects specify one or more container objects by:
      assigning to each specified container object an internal number,
      identifying a container type for each specified container object, wherein the container type for at least one specified container object is one of a docking container, custom container and splitter container, and
      identifying a level for locating each specified container object, wherein the level of the at least one specified container object having a container type of one of a docking container, custom container and splitter container is a first level;
   define a control table comprising one or more control objects;
   associate the container table and the control table to a central class; and
   assign the central class to a triggering report, the triggering reports being a report generated using control objects, the container table and the control table associated with the central class assigned to the triggering report, such that the central class, when called, separately accesses and uses the container table and the control table to provide control information rather than to provide each of a container class and a control class for the control information;
   wherein the container objects are created according to their number and level information to form graphical user interface elements of a graphical user interface rendering the report.

11. A computer program product as in claim 10, further comprising executable instructions causing a data processing apparatus to: specify an alignment and width for each specified container object.

12. A computer program product as in claim 11, wherein the instructions to define a control table comprising one or more control objects comprises instructions to insert a selection of at least one of a plurality of control objects into the at least one specified container object having a container type of one of a docking container, custom container and splitter container.

13. A computer program product as in claim 11, wherein the instructions to define a control table comprising one or more control objects comprises instructions to:
   define at least one of the container objects as a splitter container object;
   associate the splitter container object with the at least one specified container object having a container type of one of a docking container, custom container and splitter container;
   insert a selection of at least one of a plurality of control objects into the splitter container object; and
   place the splitter container on a second level.

14. A computer program product as in claim 13, wherein the instructions to define at least one of the control objects as a splitter container object comprises instructions to:
   identify a container type for at least one of the control objects as a splitter container;
   assign an internal number to the splitter container object; and
   define one or more rows and one or more columns for the splitter container object.

15. A computer program product as in claim 14, wherein the instructions to associate the splitter container object with the at least one specified container object having a container type of one of a docking container, custom container and splitter container docketing container object comprises instructions to: designate the at least one specified container object as the parent of the splitter container object.

16. A computer program product as in claim 10, wherein the instructions to define a control table comprising one or more control objects comprises instructions to:
   identify a first one of the control objects as one of a docking container and a custom container and a second one of the control objects as a splitter container;
   insert the second one into the first one; and
   insert at least one of a plurality of control objects into the second one.

17. A computer program product as in claim 10, wherein the instructions to define a control table comprising one or more control objects comprises instructions to:
   select a control object for each container object; and
   insert the selected control object into the corresponding container object.

18. A computer program product as in claim 10, further comprising executable instructions causing a data processing apparatus to:
   activate the triggering report;
   call the central class upon activation of the triggering report;
   generate the one or more container objects and the one or more control objects based on the called central class; and
   display the one or more control objects.

19. A computer program product as in claim 17, further comprising executable instructions causing a data processing apparatus to:
   collect a data associated with the triggering report from a data repository; and
   display the collected data.

20. A computer program product, embodied on computer-readable storage material to handle events implemented in a control factory class, the computer program product including executable instructions causing a data processing apparatus to:
   receiving user-generated input selecting a node of a control to expand in a graphical user interface;
   calling, based on the selected node, a matching event handler of a helper class which holds data corresponding to the selected node;
   triggering, by the matching event handler of the helper class, an event which causes the control factory class to pass its own instance as a parameter;

calling, within a matching event handler of the control factory class, a matching callback routing from a triggering report module that is responsible for collection of data to display from a data repository as a report, the report being generated using control objects; and expanding the selected node;

wherein the control factory class separately obtains control information from a container table and a control table.

* * * * *